US006972095B1

(12) United States Patent
Bushart et al.

(10) Patent No.: US 6,972,095 B1
(45) Date of Patent: Dec. 6, 2005

(54) MAGNETIC MOLECULES: A PROCESS UTILIZING FUNCTIONALIZED MAGNETIC FERRITINS FOR THE SELECTIVE REMOVAL OF CONTAMINANTS FROM SOLUTION BY MAGNETIC FILTRATION

(75) Inventors: Sean P. Bushart, Mill Valley, CA (US); David Bradbury, Wotton-under-Edge (GB); George Richard Elder, Westbury-on-Severn Glos (GB)

(73) Assignee: Electric Power Research Institute, Palo Alto, CA (US)

(*) Notice: Subject to any disclaimer, the term of this patent is extended or adjusted under 35 U.S.C. 154(b) by 59 days.

(21) Appl. No.: 10/434,521

(22) Filed: May 7, 2003

(51) Int. Cl.[7] .......................... B01D 21/26; G21F 9/00
(52) U.S. Cl. ...................... 210/670; 210/660; 210/681; 210/682; 210/695; 252/62.51 R; 252/62.53; 252/62.56; 588/13; 588/15; 376/309; 376/310; 530/391.1; 530/391.7; 423/6
(58) Field of Search ................................ 210/660, 670, 210/681, 682, 695, 222; 588/13, 15; 530/391.1, 530/391.7; 436/526; 423/6; 376/309, 310; 252/62.51 R, 62.56, 62.53

(56) References Cited

U.S. PATENT DOCUMENTS 4,138,383 A 2/1979 Rembaum et al.
4,269,826 A 5/1981 Zimmermann et al.
4,554,088 A 11/1985 Whitehead et al.
4,672,040 A 6/1987 Josephson
4,698,302 A 10/1987 Whitehead et al.
5,248,589 A 9/1993 Bose et al.
5,358,722 A 10/1994 Monzyk
5,491,219 A * 2/1996 Mann .................. 252/62.51 R
5,790,964 A 8/1998 Pourfarzaneh
5,852,786 A 12/1998 Bradbury et al.
6,013,106 A 1/2000 Tweden et al.

FOREIGN PATENT DOCUMENTS

EP 0 522 856 A1 1/1993

OTHER PUBLICATIONS

Meldrum, Fiona et al., Synthesis of Inorganic Nanophase Materials in Supramolecular Protein Cages Cont. Letters to Nature, vol. 349, Feb. 21, 1991.

Meldrum, Fiona et al., Magnetoferritin: In Vitro Synthesis of a Novel magnetic Protein, Cont. Science, vol. 257, Jul. 24, 1992.

St. Pierre, T.G., et al., Synthesis, Structure and Magnetic Properties of Ferritin Cores with Varying Degrees of Structural Order: Models for Iron Oxide Deposits in Iron-Overload Diseases Corrdination Chemistry Reviews, 151 (1996) 125-143.

* cited by examiner

*Primary Examiner*—David A. Reifsnyder
(74) *Attorney, Agent, or Firm*—Dergosits & Noah LLP

(57) ABSTRACT

A decontamination system uses magnetic molecules having ferritin cores to selectively remove target contaminant ions from a solution. The magnetic molecules are based upon a ferritin protein structure and have a very small magnetic ferritin core and a selective ion exchange function attached to its surface. Various types of ion exchange functions can be attached to the magnetic molecules, each of which is designed to remove a specific contaminant such as radioactive ions. The ion exchange functions allow the magnetic molecules to selectively absorb the contaminant ions from a solution while being inert to other non-target ions. The magnetic properties of the magnetic molecule allow the magnetic molecules and the absorbed contaminant ions to be removed from solution by magnetic filtration.

12 Claims, 3 Drawing Sheets

MAGNETIC MOLECULES: A PROCESS UTILIZING FUNCTIONALIZED MAGNETIC FERRITINS FOR THE SELECTIVE REMOVAL OF CONTAMINANTS FROM SOLUTION BY MAGNETIC FILTRATION

BACKGROUND

There are many known techniques for removing dissolved impurities from water. Existing water purification techniques include evaporation, ion exchange and reverse osmosis. Although these techniques produce pure water, they are not capable of selectively removing certain target impurities while leaving all other impurity constituents dissolved in the solution. This selective removal of contaminant ions from a liquid solution is a very common requirement in radioactive decontamination applications such as nuclear power plants and other nuclear facilities. In nuclear liquid cooling systems and effluents radioactive species may exist in very low molar concentration (typically about $10^{-15}$ to $10^{-12}$ moles per liter) while other harmless dissolved species are present in much greater concentrations. In nuclear applications, it is desirable to selectively remove only the radioactive species while leaving the harmless dissolved species in the water solution. The removed radioactive waste requires careful containment and disposal processing. The volume of radioactive waste must be rigorously minimised for safety and economic reasons. If harmless dissolved species are removed and handled together with the radioactive contaminants, the resulting waste volume will be excessively large creating disposal problems.

Methods for selectively separating the radioactive ions from the contaminated solution have been developed which are based upon the substantial difference in chemical properties of the radioactive ions and the harmless dissolved species. The most typical way of removing contaminants from solution is to transfer the contaminants to a different phase, normally from liquid to solid. Solid particles are added to the contaminated solution which selectively bind to the radioactive ions but do not bind to other harmless ions. The solid particle and attached radioactive ions are then removed from the solution using solid liquid separation techniques. This technique for removing radioactive ions has been applied on an industrial scale. The Sellafield plant in the United Kingdom uses the solid absorber clinoptilolite to selectively remove cesium and strontium ions from the plant's effluents.

There are, however, problems to be overcome in designing a selective removal process as described above. In order to have adequate capacity to hold the contaminants, the particles which bind to the radioactive ions must either be large and porous or very small. Large porous particles evenly absorb and distribute the contaminants throughout the volume of the particle. Robust porous particles, such as clinoptilolite, are difficult to create and usually have limited selectivity to absorb only the desired radioactive ions. Although clinoptilolite absorbs cesium and strontium ions, many other types of harmless ions will also be absorbed.

Smaller particles and large porous particles are substantially different. The smaller particles are not porous and target contaminants can only bind to their outer surfaces. If the particles are sufficiently small they will have an adequate absorption capacity, but they then become more difficult to separate from the solution using solid liquid separation techniques. Small particles do have the advantage of being more easily created to selectively absorb target contaminants while being inert to non-target ions.

Another method of removing radioactive ions utilises small magnetic particles which bond to target contaminant ions and are removed from the solution by magnetic filtration. The small solid magnetic particles are fabricated by surrounding a solid magnetic core, such as magnetite, with an organic polymer. The organic polymer has a selective ion exchange function which allows the particles to attach to specific contaminant ions and not react with other ions. The organic polymer is attached to the magnetic core using an emulsion polymerisation method. The magnetic particles have a minimum diameter of about 10 to 100 microns. It is not possible to further reduce the size of these magnetic particles significantly because of the emulsion polymerisation method used. For effective magnetic filtration the magnetic core also has to have a minimum size which is necessary for efficient magnetic filtration. During magnetic filtration the small magnetic particles must migrate through the solution under magnetic force alone. Recent advances in magnetic filter design have, however, significantly reduced the size of particles which can be efficiently removed by magnetic filtration. A problem with these prior art magnetic decontamination particles is that their contamination absorption capacity is small. This inefficiency is due to the ion exchange functionality only being present on the surface of the particles and not throughout the entire volume. To overcome this lack of capacity, the absorption reaction is often made reversible. After being removed from the solution, the contaminants are removed from the particles and the particles thereafter reused. The reversible absorption reaction limits the choice of selective ion exchange functions which can be used and reduces the absorption selectivity for the target contaminant.

SUMMARY OF THE INVENTION

The present invention utilises synthesised magnetic molecules which have a specific ion exchange function to selectively react with a particular type of ionic contamination in a liquid solution. The magnetic molecules include a very small ferritin structure with a magnetic core and an ion exchange function attached to the outer surfaces. The ferritin structure has a central hole which may contain a native core. The native core may be removed leaving a non-magnetic "apoferritin" and a highly magnetic material may be inserted into the central hole of the ferritin structure. The ion exchange function may be attached to the ferritin structure by organic reaction sequences. The ion exchange function of the magnetic molecules selectively bonds to a specific type of contaminant ion. For example, ion exchange functions can selectively target radioactive contaminant ions such as cobalt, cesium and plutonium.

The inventive process is an improvement over the prior art decontamination processes because the magnetic molecules are much smaller but have sufficient magnetic properties to be easily removed from a solution by magnetic filtration. The inventive magnetic molecules have a diameter of about 12 nanometers. This smaller magnetic molecule size creates a substantially higher absorptive surface areas per volume of magnetic molecule than the larger diameter prior art magnetic particles. Thus, a much smaller volume of magnetic molecules is required to decontaminate a solution.

The magnetic molecules are mixed with the contaminated solution and the ion exchange function bonds with specific types of contaminant ions while being inert to other ions. The magnetic molecules must come into contact with the target contaminant ions for the binding reaction to occur. The solution may be mechanically agitated to induce contact between the contaminant ions and the magnetic molecules. Each magnetic molecule may target one specific contaminant ion and for complete removal of this contaminant ion there must be enough magnetic molecules to absorb all of the contaminant ions. A single type of magnetic molecule can be used if only one type of ionic contaminant is being removed. However, it is also possible to use more than one type of magnetic molecule, each having a different ion exchange function to simultaneously remove two or more types of contaminant ions.

The contaminant ions and magnetic molecules are removed from the solution by magnetic filtration after the contaminant ions are absorbed by the magnetic molecule. The magnetic filtration may require passing the solution through a magnetic filter having a high tesla magnet surrounding a mesh or powder filter element. When the filter is full, a cleaning process is performed to release the trapped magnetic molecules and the absorbed contaminant ions. The magnetic field of the magnetic filter is turned off and the particles are easily be flushed out of the filter.

The magnetic molecules and absorbed contaminants may be disposed or alternatively the magnetic cores may be separated from the magnetic molecules and reused. To reuse the magnetic cores, the ferritin structure of the magnetic molecule may be destroyed using a chemical reaction such as alkaline hydrolysis or wet oxidation. The magnetic core can then be removed from the magnetic molecule and reused to fabricate new magnetic molecules.

The decontamination process may be performed in a pipeline which transports the contaminated solution. The magnetic molecules may be added to the pipeline and mixed with the contaminated solution. As the solution flows through the pipeline, the target contaminant ions selectively bond to the magnetic molecules. The solution then flows through a magnetic filter which traps the magnetic molecules and contaminant ions. The rest of the solution may exit the magnetic filter in a decontaminated state.

BRIEF DESCRIPTION OF THE DRAWINGS

The invention is herein described, by way of example only, with reference to embodiments of the present invention illustrated in the accompanying drawings, wherein.

DETAILED DESCRIPTION

Figure 1:
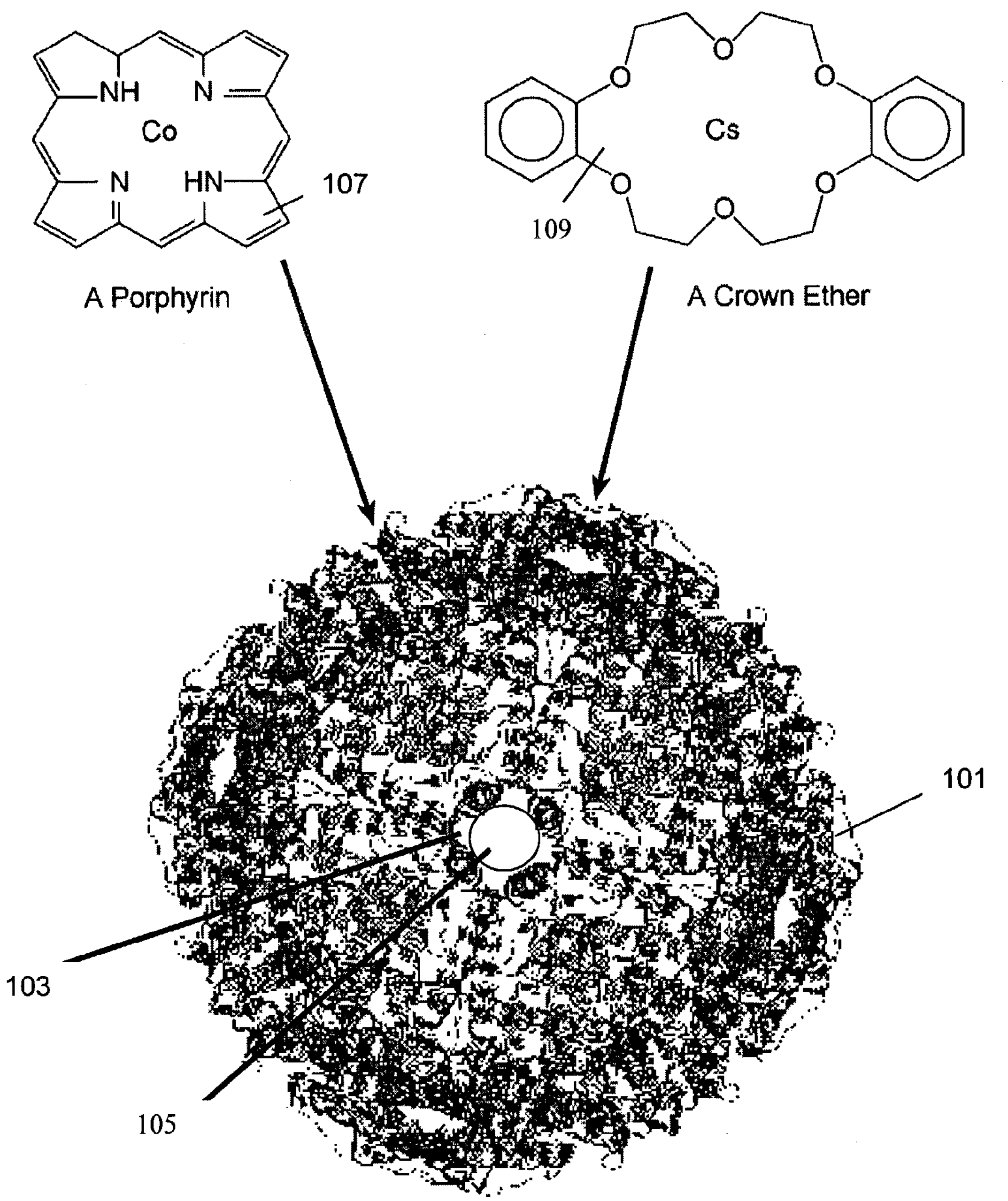
FIG. 1 illustrates an embodiment of a magnetic molecule.

The inventive magnetic molecules have selective ion exchange properties which bond to specific contaminant ions in a solution. The size of the inventive magnetic molecules is much smaller than prior art magnetic particles which improves the decontamination efficiency. The magnetic molecules are formed by inserting a highly magnetic core into a ferritin structure and bonding an ion exchange function to the a ferritin structure. The ferritin magnetic molecules have a diameter about three orders of magnitude less than that the prior art magnetic particles. The smaller magnetic molecule size is essential to absorption capacity because the contaminant ions are only absorbed onto the exposed surfaces of the magnetic molecules. The smaller diameter inventive magnetic molecules have a much greater surface area to volume ratio than prior art magnetic particles which greatly increases the smaller magnetic molecule's capacity for absorbing contaminant ions.

In order to sythesize small magnetic molecules, very small magnetic cores are required. Small species called "ferritins" can be adapted to have magnetic properties suitable for inventive decontamination process. Ferritins consist of a spherical shell having an external diameter of about 12 nanometers and a cavity having an inner diameter of about 8 nanometers. The shell of the ferritin is a complex protein made up of 24-peptide sub-units made up of amino acids. The cavity of the ferritin shell naturally accumulates iron cores in the form of oxides and hydroxides. Ferritins are produced by mammals and serve the purpose of iron storage in areas such as the liver and spleen. Naturally occurring ferritins (such as horse spleen ferritin) are commercially available. It is also possible to synthetically fabricate ferritins.

A characteristic of ferritins is that the core materials can be removed yielding a non-magnetic "apoferritin." The removed core material can then be replaced with an intensely ferromagnetic material which substantially enhances the magnetic properties. The magnetic ferritin may be formed by precipitating the magnetic materials from solution into the cavities of the apoferritin. This type of enhanced ferritin is also known as "magnetoferritin." The use of ferritins as magnetic media in the digital information storage industry has been disclosed in U.S. Pat. No. 5,491,219. The size and magnetic properties of the magnetoferritin make the inventive magnetic molecules superior in performance to the prior art magnetic particles.

The magnetic molecule is synthesized from a magnetic ferritin and a selective ion exchange function chosen by virtue of its known ability to bind the desired target contaminant ions while rejecting other ions present in the solution. In an embodiment, the peptide sub-units surrounding the magnetic molecule are amino acids such as leucine, alanine and glutamine (Leu-Ala-Glu). These amino acids on the ferritin surface are used to attach the ion exchange functions to the ferritin structure by organic reaction sequences which form covalent bonding. There are a wide variety of possible selective ion exchange functions. The ion exchange functions have highly selective properties which can capture specific contaminant ions which are in low concentrations while being inert to other solution constituents which are not target contaminants and may be present in much higher concentrations. Examples of target contaminants include: radionuclides such as cobalt, cesium or plutonium and other specific non-radioactive contaminants. The ion exchange function is selected to be inert to other non-radioactive and/or non-hazardous constituents such as sodium which may be present in much greater concentrations than the target contaminant ions. If more than one contaminant is present, a combination of different magnetic molecules can be used together to decontaminate the solution.

The ability of the ion exchange function to properly absorb target ions while avoiding the absorption of non-target ions is known as "selectivity." An ion exchange function which has a high selectivity absorbs primarily target ions while being inert to non-target ions. In contrast, low selectivity ion exchange functions absorb both target and non-target ions which are similar in size. Higher selectivity ion exchange functions are more efficient because a higher percentage of target ions are absorbed by the magnetic molecules.

Selectivity is achieved either through differences in the thermodynamic free energy of binding between the ion exchange function and the contaminant ion compared with the non-hazardous constituents, or through kinetic differences in the rate of the binding reaction. Many factors influence this selectivity, such as the geometry of the ion exchange function, polarizability and cavity size. These factors are generally well known and established in the field of inorganic chemistry.

The ion exchange function can be either reversible or irreversible. Reversible ion exchange functions allow the magnetic molecule to bond to and release the target ion. More specifically, magnetic molecules with reversible ion exchange functions may be added to a solution and the target ions may be absorbed. The magnetic molecules may then be removed from the solution and the reversible ion exchange function can release the contaminant ions. The magnetic molecules can then be reused to remove more contaminants from the solution. If the absorption reaction is reversible, the thermodynamic binding between the contaminant and the ion exchange function must be relatively weak, and this limits the selectivity achievable.

Irreversible ion exchange functions do not allow the target contaminant ions to be released after they have been absorbed by the magnetic molecule. Because the ion exchange function does not release the target contaminant ions the magnetic molecules can only be used once. The ion exchange function can be chosen so that the binding between the magnetic molecule and the contaminant ion can be very strong, which results in a higher selectively than prior art magnetic molecules that have a reversible ion exchange function. Although the irreversible ion exchange function cannot be reused, there are methods for recycling the magnetic cores of the magnetic molecules, which will be discussed in more detail below.

In an embodiment, the ion exchange functions of the magnetic molecules have the highest possible selectivity to only absorb specific target radionuclides or other low concentration contaminant ions from a solution. When the selectivity is high the volume of waste produced by the decontamination system is minimised because the magnetic molecules primarily absorb only the contaminants and other non-harmful ions are not absorbed. Examples of selective ion exchange functions include: crown ethers which selectively binds cesium while being inert to sodium, porphyrins which selectively bind to cobalt and diethylene tetramine penta-acetic acid (DTPA) which is described in the example below to selectively bond to strontium but does not react with cesium. FIG. 1, illustrates a magnetic molecule 101 based upon a ferritin protein structure having a central cavity 103 which contains a magnetic core 105 and ion exchange functions. The magnetic core 105 provides the magnetic properties of the ferritin protein structure 101 with magnetic properties. Selective ion exchange functions such as porphyrins 107 or crown ethers 109 are attached to the ferritin protein structure 101. Because the illustrated magnetic molecule has both porphyrin 107 and crown ether 109 ion exchange functions, both cobalt and cesium are selectively bonded. Specific chemical reactions are used to attach the selective ion exchange function to the ferritin which will be described in more detail later.

In general, each magnetic molecule will only have a single type of attached ion exchange function for absorbing a single contaminant. If multiple types of contaminants are being removed, different types of magnetic molecules having the corresponding ion exchange functions are used together. Alternatively, as illustrated in FIG. 1, a single type of magnetic molecules having multiple ion exchange functions can be added to a solution to remove multiple types of contaminants.

Another factor that must be considered is the compatibility of the magnetic molecules with the contaminated solution. The ferritin structure of the magnetic molecules may only be functional within a limited range of solution environments. For example, if the solution is a strongly acid or alkaline the ferritin structure of the magnetic molecules may be destroyed or functionality may be impaired. In most potential nuclear applications of the invention, the contaminated solution is likely to be within an acceptable range (pH 3–10). In other applications, the acceptable pH level may be outside this specified range. If the pH level is outside the acceptable range, the contaminated solution may need to be pre-treated by neutralization before the magnetic molecules are added to ensure that the magnetic molecule will be chemically stable when mixed with the solution.

After the appropriate magnetic molecule for the contaminated solution has been determined, the target contaminant absorption characteristics of the magnetic molecules should be determined. Only when the absorption characteristics are known, can the required quantity of magnetic molecules to add to the solution for decontamination be estimated. The absorption characteristics of the magnetic molecule for the contaminant ion can be determined experimentally.

The total absorption capacity of the magnetic molecules can be determined by mixing a known quantity of the magnetic molecule in a dialysis bag containing a solution having a known concentration of target contaminant ions. After equilibration, the contents of the dialysis bag are analysed to determine the quantity of contaminant ions held by the magnetic molecule. Multiple tests can be performed with varying parameters such as: quantities magnetic molecules, concentrations of contaminant ion and concentrations of non-target ions. These contamination absorption tests can also be compared to a "blank" test conducted under the same conditions except that only the magnetic ferritin precursors without the ion exchange function are mixed in the dialysis bag. The magnetic molecule's absorption capacity for the target contaminant ion can then be determined from the results of these tests.

Another absorption characteristic which should be determined is the magnetic molecule's kinetics of absorption. To determine the magnetic molecule's contamination absorption rate, the solution must first be analysed to determine the target contaminant ion concentration. If the contaminant is radioactive, the analysis must also determine if any non-radioactive isotopes of the same element are present. The kinetics of absorption testing can be conducted by stirring a known quantity of magnetic molecules with solution samples containing a known quantity of the target contaminant ion for varying lengths of time. The magnetic molecules are then removed from the solution and the quantity of target contaminant ions remaining in solution is determined. The contamination absorption rate or kinetics of absorption can be determined by knowing the quantity of contaminants absorbed and the time of exposure of the magnetic molecules to the contaminated solution. Because the kinetics of absorption are variable depending upon many different factors, separate tests may be required for each type of magnetic molecule, contaminated solution chemistry and decontamination system configuration.

After the kinetics of absorption for the magnetic molecule have been determined, the decontamination system can be designed. The appropriate quantity of magnetic molecules should be added to the solution to adequately absorb all of the contaminant ions taking into account the kinetics of absorption. If the decontamination system is being used with a continuous flow system, the flow rate of magnetic molecules into the solution should be at least sufficient to remove all the contaminant ions present. The flow rate of magnetic molecules into the solution may be increased to insure that all contaminant ions are absorbed. Because the magnetic molecules may be expensive to produce, the decontamination system should be designed to add just enough magnetic molecules to remove all of the contaminant ions with a reasonable safety factor.

Figure 2:
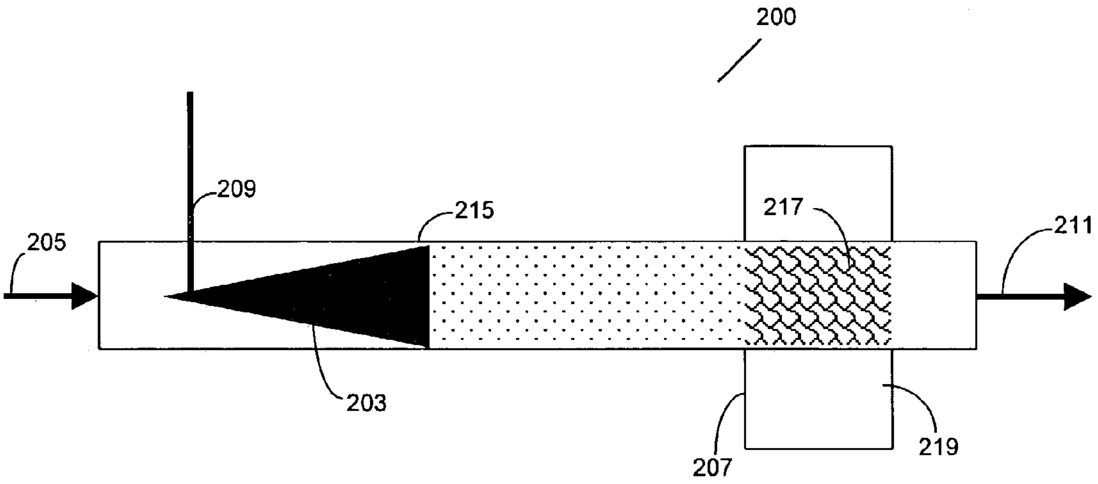
FIG. 2 illustrates a pipeline embodiment of the decontamination system.

The basic design of the decontamination system will depend upon the contamination absorption rate of the magnetic molecules. Once the target contaminants are absorbed, the magnetic molecules are removed by magnetic filtration of the solution. If the kinetics tests show that absorption of the contaminant ions is very rapid, an end of pipe type decontamination system can be used. FIG. 2 illustrates an example of an end of pipe type decontamination system 200 through which a contamination solution 205 flows through a pipe 215. The magnetic molecules 203 can be introduced into a contamination solution 205 flow stream at a point 209 in the pipe 215 upstream of a magnetic filter 207. The magnetic filter may comprise an electro magnet 219 and a magnetic filtration medium 217. As soon as the magnetic molecules 203 contact the solution 205, the magnetic molecules 203 begin to absorb the contaminant ions. By the time the contamination solution 105 and the magnetic molecules 203 reach the magnetic filter 207, all of the contaminant ions have been absorbed by the magnetic molecules and the decontaminated solution 211 exits the magnetic filter 207. Various system adjustments can be made to the decontamination system to vary the exposure time of the magnetic molecules 203 to the contaminant ions. The pipe distance between the magnetic molecule inlet point 209 and the magnetic filter 207 can be adjusted. The flow rate of the solution 205 can be adjusted by changing the diameter of the decontamination system pipe 215. In an embodiment, a mechanical mixing device may be used to increase the mixing of the magnetic molecules in the solution.

Alternatively, if the kinetics of absorption are slow, the magnetic molecules can be mixed with the contaminated solution in a tank for the appropriate period of time. A mechanical device may be used to agitate the magnetic molecules in the tank to enhance mixing and increase the absorption of the target contaminant ions. After all the contaminant ions have been absorbed, the magnetic molecules can be separated from the solution by magnetic filtration. This type of decontamination system may be useful for applications that do not require continuous decontamination of the solution.

Magnetic filtration technology has improved considerably and the inventive small magnetic molecules may now be efficiently separated from a solution using commercially available magnetic filters. A suitable commercially available magnetic filter may include a high tesla magnet surrounding a mesh or powder magnetic filtration medium. The high tesla magnet can be either a superconducting or a conventional electromagnet. The magnetic molecules in the contaminated solution flow through the magnetic filter which removes the magnetic molecules together with the bound contaminant ions. If all of the contaminant ions have been absorbed, the solution flowing out of the magnetic filter will be completely decontaminated.

In an embodiment, the decontamination system can be used to purify water for drinking or remove target ions from a solution for other purposes. The magnetic molecules are added to the water flow stream and the magnetic molecules attach themselves to all of the contaminant ions before the water flows through the magnetic filter. The magnetic filter removes the magnetic molecules and purified water exits the magnetic filter.

Figure 3:
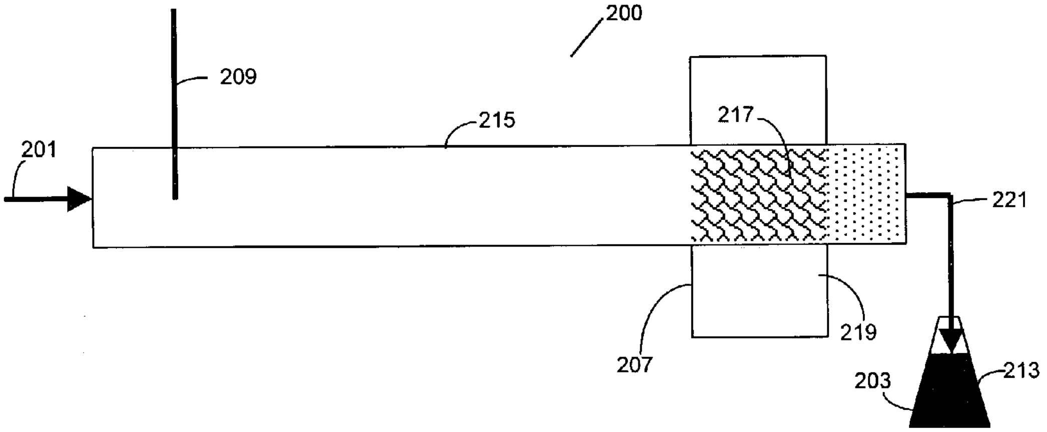
FIG. 3 illustrates the pipeline embodiment of the decontamination system when the magnetic molecules are removed from the magnetic filter.

When the magnetic filter is fully loaded the magnetic field is removed from the filter element. The magnetic filter may first be turned off by switching off the magnet power, or removing the filter element from the magnetic field. The magnetic molecules are then flushed out of the filter in a small volume of water for subsequent waste management. FIG. 3 illustrates a method for cleaning the magnetic filter 207. The magnetic fields of the magnetic filter's 207 electromagnet 219 are turned off and water 201 flows through the pipe 215 and the magnetic filtration medium 217. The fluid flow 221 from the magnetic filter 207 is diverted out of the piping system and the magnetic molecules 203 and contaminant ions are collected in a container 213. In an embodiment, the steps of mixing, ion collection and backflushing can be accomplished in a single continuous process. The materials removed from the filtration medium 217 containing the contaminants can be treated by the standard disposal methods, such as evaporation or cementation. Radioactive waste may require special containment and storage in safe areas to prevent exposing people to radiation.

Alternatively, after the magnetic molecules are removed from the solution, the magnetic molecule structure can be destroyed and the magnetic cores can be removed and made into new magnetic molecules for future decontamination. Various methods are possible for destroying the magnetic molecule including, alkaline hydrolysis and wet oxidation. When wet oxidation is used, the magnetic molecule is reacted with hydrogen peroxide catalysed with a transition metal catalyst. After the magnetic molecule structures are destroyed, the magnetic cores can be recovered. The recovered magnetic cores are dissolved and redeposited into new empty apoferritin to make new magnetic molecules. The recycling of the magnetic cores may be very economical if the magnetic molecules use expensive exotic magnetic core materials. Removing the magnetic cores may also reduce the waste volume which may only include the remains of the ferritin structure, the ion exchange function and the target contaminant ions. The described separation of the magnetic cores is very difficult or impossible with the larger prior art magnetic molecules.

The following is an example of a magnetic molecule fabrication process which bonds diethylene tetramine pentaacetic acid (DTPA) to magnetic ferritin. Diethylene Triamine Penta Acetic Acid (DTPA) 1 g, and trimethylamine (1.25 g) were dissolved in 20 ml double distilled, deionized water with gentle heating. The solution was lyophilized to yield a glassy residue. The resulting pentaethylammonium DTPA was dissolved in 20 ml acetonitrile with gentle heating. The solution was then cooled to 0° C. in an ice bath and isobutyl chloroformate (0.35 g) was added. The reaction fluid was stirred for an additional 30 minutes during which time triethylamine hydrochloride precipitated. The reaction mixture was then filtered and the solvent was evaporated to yield the carboxycarbonic anhydride of DTPA. This compound (0.042 g) was then added to a cooled solution containing of 0.078 g of magnetic ferritin in 10 ml of 0.1 M sodium bicarbonate. This was subsequently dialyzed against acetate buffer pH 6, followed by pH 7.4 to remove biproducts such as isobutanol and non-conjugated DTPA. After dialysis, the magnetic ferritin-DTPA "magnetic molecule" solution was transferred to storage at 4° C. for subsequent use. The magnetic ferritin used in this example was produced by Nanomagnetics Ltd. of Bristol, United Kingdom.

The synthesised magnetic molecule solution was then used to selectively remove strontium from a test contamination solution. In this experiment, 10 mg of the magnetic molecule in solution was stirred for 20 minutes with a 20 ml test contamination solution containing cesium 103 ppm (2.06 mg) and strontium 88 ppm (1.78 mg) at ambient temperature. The magnetic filter used 20 ml of ferritic stainless steel powder at 150 micron ion size which was placed between two rare earth permanent magnets. The flow rate of the solution through the magnetic filter was controlled to 100 ml/hour until the entire test contamination solution and magnetic molecules had passed through. The magnetic filter was subsequently rinsed with a buffer solution with the magnets still in place. The two rare earth permanent magnets were then removed and the filter was backwashed with the buffer solution to remove the magnetic molecules.

Both the effluent which passed through the magnetic filter and the backwash trapped by the magnetic filter were analysed to determine the effectiveness of the decontamination system. The results of the selective decontamination testing are shown in Table 1 below. The results indicate that the magnetic ferritin-DTPA magnetic molecules selectively bonded to the strontium but not to the cesium. More specifically, 42% (0.74 mg) of the original strontium was bonded to the magnetic molecules and trapped by the magnetic filter while none of the cesium was absorbed by the magnetic molecules or trapped by the magnetic filter. This result equates to an absorption capacity of 1.68 milliequivalents of strontium per gram of magnetic molecule. This should be compared with the capacity of the best fully porous non-selective ion exchangers, which have a capacity of about 5 milliequivalents per gram. Bearing in mind that the magnetic ion exchanger has to have a non-functionalised magnetic core this result indicates close to the maximum capacity theoretically achievable.

The effluents represent the quantity of each material that was passed through the magnetic filter without being trapped. In this experiment 57% (1.0 mg) of the strontium and 97% (2.0 mg) of the cesium passed through the magnetic filter. The experiment clearly illustrates the selective bonding capabilities of the magnetic molecules. The removal of the target contaminant ion can be improved by increasing the quantity of magnetic molecules added to the contamination solution.

TABLE 1

| Sample | Strontium (mg) | Cesium (mg) |
|---|---|---|
| Original Mixture | 1.76 | 2.06 |
| Effluent | 1.0 | 2.0 |
| Backwash | 0.74 | Not Detectable |

Because the inventive decontamination system can target particularly hazardous radioactive materials, it may be particularly useful in nuclear decontamination applications. For example, the inventive magnetic molecules having a first ion exchange function can be used to selectively remove radioactive cobalt from nuclear power plant effluents. By separating the radioactive cobalt only, the radioactive waste, which requires special containment and disposal processes, is minimised.

Magnetic molecules having a different ion exchange function can also be used to selectively collect alpha emitters. In some cases alpha emitters in solid waste at nuclear power plants cause the waste to be in a radioactive waste class known as "Greater than Class C" which creates special disposal problems. The magnetic molecules can separate the alpha emitters from the effluents before or after the waste is formed. Magnetic molecules which target the alpha emitters can be added to the effluents and magnetically filtered to separate the alpha emitters. Alternatively, the alpha emitters can be separated by solution leaching the separated waste using the magnetic molecules. The result of either method for separating the alpha emitters is that a much smaller volume of the nuclear power plant waste will require treatment as Greater Than Class C waste.

Other applications for the inventive magnetic molecules include the selective removal of the radionuclides antimony-124 and 125 and technetium-99. Antimony is another troublesome radioactive nuclide in nuclear power plant liquid waste streams. Radionuclide technetium-99 is a hazardous waste created by nuclear fuel reprocessing which has been found in off-site environmental samples. For these and various other applications, magnetic molecules can be used to separate target contaminant ions from non-hazardous or less hazardous waste products.

Other applications for the inventive magnetic molecules include the selective removal of the radionuclides antimony-124, antimony-125 and technetium-99. Antimony is another troublesome radioactive nuclide in nuclear power plant liquid waste streams. Radionuclide technetium-99 is a hazardous waste created by nuclear fuel reprocessing which has been found in off-site environmental samples. For these and various other applications, magnetic molecules can be used to separate target contaminant ions from non-hazardous or less hazardous waste products.

In the foregoing, a magnetic molecule decontamination system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for decontaminating a solution containing contaminant ions comprising the steps of:

fabricating a magnetic molecule by attaching an ion exchange function to a first ferritin structure;

placing the magnetic molecule into the solution;

selectively reacting the magnetic molecule with the contaminant ion to bound the magnetic molecule to one or more of the contaminant ions; and extracting the magnetic molecule and the bound contaminant ions from the solution by magnetic filtration.

2. The method for decontaminating the solution of claim 1 wherein the fabricating step includes inserting a magnetic core into an apoferritin.

3. The method for decontaminating the solution of claim 2 wherein the fabricating step includes removing a native core material from the ferritin structure and leaving the apoferritin.

4. The method for decontaminating the solution of claim 1 wherein the contaminant ion is cesium.

5. The method for decontaminating the solution of claim 1 wherein the contaminant ion is cobalt.

6. The method for decontaminating the solution of claim 1 wherein the contaminant ion is plutonium.

7. The method for decontaminating the solution of claim 1 wherein the ion exchange function comprises crown ether.

8. The method for decontaminating the solution of claim 1 wherein the ion exchange function comprises porphyrins.

9. The method for decontaminating the solution of claim 1 wherein the ion exchange function comprises diethylene tetramine penta-acetic acid (DPTA).

10. The method for decontaminating the solution of claim 1 wherein the magnetic filtration comprises a high telsa magnet and a filter element.

11. The method for decontaminating the solution of claim 1 wherein the magnetic filtration comprises using a magnetic filter to capture the magnetic molecule and bound contaminant ions, and further comprising the step of:

removing the magnetic molecule and bound contaminant ions from the magnetic filter by backwashing the magnetic filter.

12. The method for decontaminating the solution of claim 1 further comprising the step of:

adjusting the pH of the contaminated solution to a level which is compatible with the magnetic molecule.

* * * * *